United States Patent Office 3,759,912
Patented Sept. 18, 1973

3,759,912
QUINOXALINES
Romano Derungs, Riehen, Switzerland, assignor to Hoffmann-La Roche Inc., Nutley, N.J.
No Drawing. Filed Nov. 25, 1970, Ser. No. 92,905
Claims priority, application Switzerland, Dec. 12, 1969, 18,520/69
Int. Cl. C07d 51/78
U.S. Cl. 260—250 R      4 Claims

ABSTRACT OF THE DISCLOSURE

Compounds of the formula

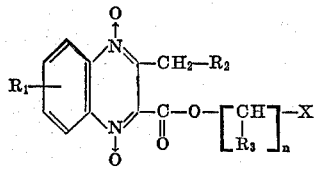

I in which $R_1$ represents hydrogen, halogen, lower alkyl or lower alkoxy, $R_2$ represents hydrogen, halogen, lower alkanoyloxy, aroyloxy, heterocyclylcarbonyloxy, lower alkanoylthio, aroylthio or heterocyclylcarbonylthio; $R_3$ represents hydrogen or lower alkyl, $n$ denotes a number from 2 to 5 inclusive; X represents lower alkoxy, lower alkylthio, lower dialkylamino, a monocyclic 5- or 6-membered saturated heterocyclic amino or a monocyclic 5- or 6-membered saturated herterocyclic amino containing an additional hetero atom selected from the group of oxygen, sulphur or nitrogen, useful as broad spectrum antimicrobials in human and veterinary medicine; novel intermediates useful in their preparation; processes for their production from the appropriate quinoxaline, N-monoxide quinoxaline, quinoxaline carboxylic acid or furazan oxide are disclosed.

SUMMARY OF THE INVENTION

This invention relates to a novel class of compounds displaying antimicrobial activity and processes for their preparation. More particularly, this invention relates to novel compounds represented by the formula

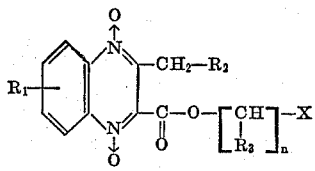

I in which $R_1$ represents hydrogen, halogen, lower alkyl, or lower alkoxy; $R_2$ represents hydrogen, halogen, lower alkanoyloxy, aroyloxy, heterocyclylcarbonyloxy, lower alkanoylthio, aroylthio or heterocyclylcarbonylthio; $R_3$ represents hydrogen or lower alkyl; $n$ denotes a number from 2 to 5 inclusive, X represents lower alkoxy, lower alkylthio, lower dialkylamino, a monocyclic 5- or 6-membered saturated heterocyclic amino or a monocyclic 5- or 6-membered saturated heterocyclic amino containing an additional hetero atom selected from the group of oxygen, sulphur or nitrogen, This invention also relates to novel intermediates useful in the preparation of the compounds represented by Formula I and which themselves are represented by the following formulas:

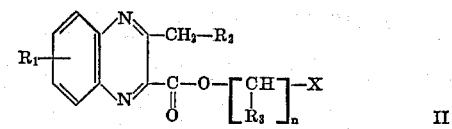

II in which $R_1$, $R_2$, $R_3$, X and $n$ have the same meanings as given in Formula I,

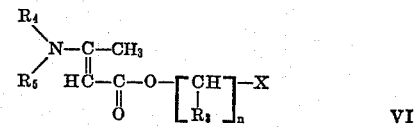

VI in which $R_3$, X and $n$ have the same meanings as given in Formula I and $R_4$ and $R_5$ represent hydrogen or lower alkyl or $R_4$ and $R_5$ are poined with the nitrogen atom to form a pyrrolidino, piperidino or morpholino group.

As used herein in Formula I and throughout the specification, halogen includes fluorine, chlorine, bromine and iodine, however, fluorine, chlorine and bromine are preferred; lower alkyl includes branched and straight chain alkyls containing from 1 to 6 carbon atoms, e.g., methyl, ethyl, propyl, isopropyl, butyl and isobutyl; lower alkoxy includes branched or straight chain alkoxy radicals containing from 1 to 6 carbon atoms, e.g., methoxy, ethoxy, and isopropoxy; in lower alkanoyloxy and lower alkanoylthio the lower alkanoyl portion includes those alkanoyl groups which are derived from lower alkanecarboxylic acids containing from 1 to 6 carbon atoms, e.g., formic, acetic and propionic acids; in aroyloxy and aroylthio, aroyl includes those aroyl groups derived from aromatic carboxylic acids containing up to 11 carbon atoms, e.g., benzoic acid, trimethoxybenzoic acid, salicylic acid, toluic acid, ethylbenzoic acid, xylic acid or naphthoic acid; heterocyclylcarbonyloxy and heterocyclylcarbonylthio include heterocyclics containing nitrogen, oxygen and/or sulphur derived from carboxylic acids having from 1 to 10 carbon atoms, for example, oxazole or isoxazole carboxylic acids, pyridine carboxylic acids, pyrimidine carboxylic acids, quinoline carboxylic acids or isoquinoline carboxylic acids.

As examples for the heterocyclic residues X there can be named the pyrrolidine, piperidine, morpholine or thiomorpholine residue.

DETAILED DESCRIPTION OF THE INVENTION

Compounds represented by Formula I, possess valuable pharmaceutical properties, for example, they are active against pathogenic bacteria and protozoa and have very low toxicities. The compounds accordingly are useful as chemotherapeutics in human and veterinary medicine. The products can be used as medicaments, for example, in the form of pharmaceutical preparations which contain the compounds in admixture with a pharmaceutical, organic or inorganic inert carrier material which is suitable for enteral or parenteral application such as, for example, water, gelatin, gum arabic, lactose, starches, vegetable oils, polyalkylene glycols, Vaseline or the like. The preparations can be provided in solid dosage form such as tablets, dragees, suppositories or liquid forms such as emulsions. The preparations may be sterilized and they may also contain additives such as preserving, stabilizing, wetting or emulsifying agents or salts for varying osmotic pressure. They can also contain other therapeutically valuable substances.

Representative compounds within the scope of this invention are:

1,4-dioxido-3-methyl-quinoxaline-2-carboxylic acid-2-ethoxyethyl ester;
1,4-dioxido-3-methyl-quinoxaline-2-carboxylic acid-3-ethoxypropyl ester;
1,4-dioxido-3-methyl-quinoxaline-2-carboxylic acid-2-morpholinoethyl ester;
1,4-dioxido-3-methyl-quinoxaline-2-carboxylic acid-2-butoxyethyl ester;
1,4-dioxido-3-methyl-quinoxaline-2-carboxylic acid-2-(2-ethoxyethoxy)-ethyl ester;
1,4-dioxido-3-methyl-quinoxaline-2-carboxylic acid-2-ethylthioethyl ester;
1,4-dioxido-3,6(or 7)-dimethyl-quinoxaline-2-carboxylic acid-2-ethoxyethyl ester;
1,4-dioxido-3-acetylthiomethyl-quinoxaline-2-carboxylic acid-2-ethoxyethyl ester;
1,4-dioxido-3-benzoyloxymethyl-quinoxaline-2-carboxylic acid-2-ethoxyethyl ester;
1,4-dioxido-3-benzoylthiomethyl-quinoxaline-2-carboxylic acid-2-ethoxyethyl ester;
1,4-dioxido-3-(2-furoyloxy)-methyl-quinoxaline-2-carboxylic acid-2-ethoxyethyl ester;
1,4-dioxido-3-(2-thenoyloxy)-methyl-quinoxaline-2-carboxylic acid-2-ethoxyethyl ester;
1,4-dioxido-3-acetoxymethyl-quinoxaline-2-carboxylic acid-2-ethoxyethyl ester;
1,4-dioxido-3-bromomethyl-quinoxaline-2-carboxylic acid-2-ethoxyethyl ester;
6(or 7)-methoxy-1,4-dioxido-3-methyl-quinoxaline-2-carboxylic acid-2-ethoxyethyl ester;
6(or 7)-chloro-1,4-dioxido-3-methyl-quinoxaline-2-carboxylic acid-2-ethoxyethyl ester.

Compounds of Formula I in which $R_1$ is either hydrogen, lower alkoxy or halogen; $R_2$ is either hydrogen, halogen or lower alkanoyloxy; $R_3$ is hydrogen and X is lower alkoxy or morpholino are preferred compounds of this invention because of their activity and low toxicity.

These preferred compounds have low toxicities, for example, in mice the lethal dosage ($LD_{50}$) on oral administration of 1,4 - dioxido - 3 - methyl-quinoxaline-2-carboxylic acid-2-ethoxyethyl ester is over 1000 mg./kg. of body weight. Of the preferred group of compounds, the most preferred, because of their strong activity and very low toxicity are 1,4 - dioxido - 3-methyl-quinoxaline-2-carboxylic acid - 2 - ethoxyethyl ester and 1,4 - dioxido-3 - methyl-quinoxaline - 2 - carboxylic acid-2-morpholino ethyl ester.

The compounds represented by Formula I manifest antibacterial action against infections caused by gram-positive agents such as Staphylococci and Streptococci and gram-negative agents such as Coli bacilli, Proteus bacilli and *Salmonella typhimurium*. This activity is comparable with antibiotics having a broad spectrum which are presently being utilized. As an example, 1,4-dioxido-3-methyl-quinoxaline-2-carboxylic acid-2-ethoxyethyl ester is very active against infections caused *Salmonella typhimurium* and is more effective than the commercial product chloramphenicol.

The compounds represented by Formula I can be prepared by alternative methods depending upon the starting materials. For example, the compounds represented by the following Formula II:

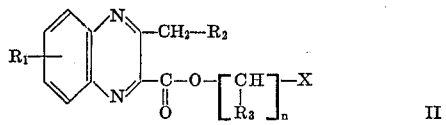

II in which $R_1$, $R_2$, $R_3$, X and $n$ have the same meanings as in Formula I or an N-monoxide of these compounds can be oxidized according to the following reaction scheme A:

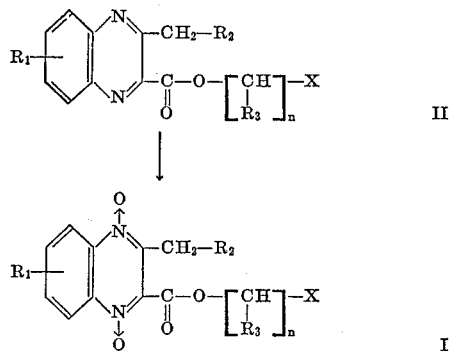

In this reaction, the quinoxaline derivative represented by Formula II or an N-monoxide thereof, is reacted with a conventional oxidizing agent, for example, a mixture of hydrogen peroxide and glacial acetic acid, with perbenzoic acid or, preferably with m-chloroperbenzoic acid. The oxidation is carried out in an organic solvent, e.g., organic acids such as acetic acid; chlorinated hydrocarbons such as chloroform or methylene chloride and the like. The reaction temperature is not critical, however, between room temperature and the boiling temperature of the reaction mixture is most efficacious. The oxidation products can be isolated and purified by conventional extraction, adsorption or fractional crystallization techniques.

Alternatively, a 1,4-dioxido-quinoxaline compound represented by the following Formula III:

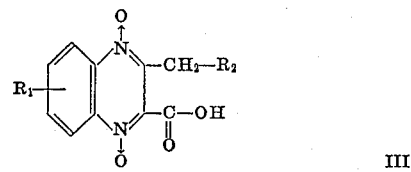

III in which $R_1$ and $R_2$ have the same meanings as given in Formula I, can be reacted with a compound represented by the following Formula IV

IV in which $R_3$, X and $n$ have the same meanings as given in Formula I, by conventional esterification methods in accordance with the following reaction scheme B:

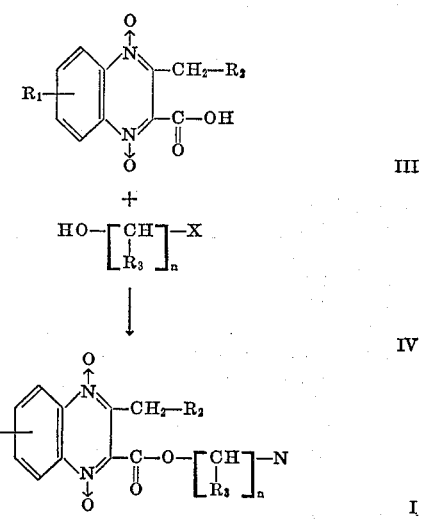

It is preferred to carry out the process of reaction scheme B under mild conditions in the presence of, e.g., cyclohexylcarbodiimide or N,N'-carbonyl-di-imidazole, or via an activated ester such as succinimido ester or via an anhydride, e.g., via the anhydride formed with ethyl carbonic acid.

A further alternative process for producing the compounds represented by Formula I is wherein the compound represented by Formula V is reacted with a compound represented by Formula VI. This is accomplished according to the following reaction scheme C:

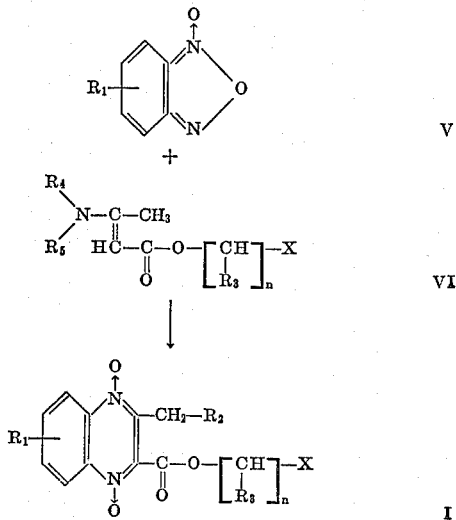

wherein $R_1$, $R_2$, $R_3$, $n$ and X have the same meanings as given in Formula I and $R_4$ and $R_5$ represent hydrogen or lower alkyl or $R_4$ and $R_5$ are joined with the nitrogen atom to form a pyrrolidino, piperidino or morpholino group.

The reaction of the furazanoxide compounds represented by Formula V with compound represented by Formula VI to produce the compounds represented by Formula I can be carried out in the presence of an ether alcohol corresponding to the alkoxy-alkyloxy group, for example, in the presence of methoxy- or ethoxyethanol, at a temperature range between room temperature and the boiling temperature of the reaction mixture.

The so-obtained compound of Formula I can be trans-esterified in a conventional manner, if desired, or the so-obtained compound of Formula I wherein $R_2$ represents hydrogen can be halogenated, if desired. The halogen atom of the halo compound obtained can be exchanged for lower alkanoyloxy, or for an aroylthio or heterocyclylcarbonylthio. The trans-esterification can be accomplished for example by treating the compound of Formula I with ethoxyethanol in the presence of catalytic amounts of a basic or acidic catalyst such as sodium metal or sulphuric acid, preferably in a temperature range lying between 0° and 40° C.

The halogenation can be accomplished for example by treating the compound of Formula I with a halogenation agent such as chlorine or bromine or N-bromosuccinimide. The chlorination is advantageously carried out in glacial acetic acid or in a chlorinated hydrocarbon, e.g., chloroform. In this process, the chlorine is added to the reaction mixture at boiling. The bromination is advantageously carried out in dimethylformamide. This bromide is preferably added dropwise at a temperature of 70–75° C. Alternatively, the bromination can be carried out using N-bromosuccinimide in the presence of a catalytic amount of dibenzoyl peroxide. Chlorinated hydrocarbons, preferably, chloroform or carbon tetrachloride are used as the solvent. The reaction temperature is preferably between room temperature and the boiling temperature of the reaction mixture.

The halide thus obtained can be acylated, for example, by reacting with a salt of an acid corresponding to the desired acyloxy residue, preferably the sodium, potassium or ammonium salt of the acid. Solvents which are useful in this reaction are water, mixtures of water with polar solvents such as lower alkanols, ether-alkanols, dioxan, acetone, acetonitrile, dimethylformamide or dimethylsulphoxide. The reaction temperature preferably is between room temperature and the boiling temperature of the reaction mixture.

The halide obtained can also be acylated directly with a free acid in the presence of a base. Bases which are suitable are tertiary amines such as triethylamine or pyridine. Solvents which are suitable for this reaction are chlorinated hydrocarbons such as methylene chloride or chloroform. The acylation can be accomplished at a temperature between room temperature and the boiling point of the reaction mixture.

In carrying out the above reactions, several novel intermediates are utilized. The compounds represented by Formula II useful as intermediates in reaction scheme A are novel compounds and can be manufactured from the corresponding ether esters of (a) 2,3-dioxobutyric acid, (b) 2-hydroxy-3-oxo-butyric acid, or (c) 2-oxo-3-hydroxy-butyric acid by reaction with orthophenylenediamine or a corresponding substituted derivative of this compound. It is also useful to protect the hydroxy groups of 2-hydroxy-3-oxo-butyric acid or 2-oxo-3-hydroxybutyric acid by a protecting group or a halogen. 2,3-dioxobutyric acid or 2-hydroxy-3-oxo-butyric acid can also be used in the form of sodium bisulphite addition salts.

If a halogen derivative of the Compounds (b) or (c) are used, it is preferably reacted with a substituted or unsubstituted orthophenylaminediamine in the presence of an additional base such as pyridine or triethylamine. This reaction is advantageously carried out in a solvent, e.g., water, alkanols such as methanol and ethanol, in ether-alkanols such as ethoxyethanol, in an ether such as dioxan or tetrahydrofuran, or in an organic acid such as acetic acid. The temperature of the reaction is advantageously between room temperature and the boiling temperature of the reaction mixture.

Other novel compounds useful as starting materials for the compounds represented by Formula I are those used as condensation components in reaction scheme C, that is, the compounds represented by Formula VI. These enamines, can be manufactured by reacting a ketone represented by the following Formula VII:

$$O=C-CH_3$$
$$H_2\overset{|}{C}-\underset{\underset{O}{\|}}{C}-O-\left[\underset{R_3}{\overset{|}{C}H}\right]_n-X \qquad VII$$

in which $R_3$, X and $n$ have the same meanings as given in Formula I, with ammonia, a primary amine or a secondary amine. Preferred amines are methylamine, dimethylamine or butylamine. The amination reaction is preferably carried out in a solvent, e.g., an alkanol such as methanol or ethanol, an ether alkanol such as ethoxyethanol. The preferred solvents are, however, dimethylformamide, dimethyl sulphoxide or tetrahydrofuran. The base or ketone reactants can function not only as a reactant but as a solvent. The temperature of the reaction is advantageously between 0° C. and the boiling point of the reaction mixture.

The ketones represented by Formula VII, i.e., the etherified acetoacetic acid esters, can be obtained by reacting the corresponding ether-alcohol with diketene. This reaction can be accelerated by the use of acidic or basic catalysts, e.g., alkali metals, such as sodium; alkali hydroxides such as sodium hydroxide; alcoholates such as sodium methylate; or organic bases such as pyridine; inorganic or organic acids such as sulphuric acid or para-toluenesulphonic acid also can be used as catalysts. The temperature of this reaction, which is exothermic, can be held low by cooling, but in order to complete the reaction, the temperature can be allowed to increase towards the end of the reaction up to the boiling point of the reaction mixture by heating.

The compounds represented by Formula VI which are produced from the compounds of Formula VII can be isolated and reacted with the furazan oxides represented by Formula V. It is advantageous, however, to react the enamine represented by Formula VI prior to its isolation by reacting it in situ with the furazan oxide represented by Formula V.

The compounds of this invention are prepared in accordance with the following illustrative examples.

EXAMPLE 1

1.5 g. of 3-methyl-quinoxaline - 2 - carboxylic acid 2-ethoxyethyl ester are dissolved in 50 ml. of chloroform at room temperature and treated with 3.8 g. of m-chloroperbenzoic acid. The reaction mixture is heated under reflux conditions for 12 hours and thereafter cooled. The excess m-chlorobenzoic acid is extracted with a saturated sodium bicarbonate solution, with the addition of ice. The chloroform solution is separated off, dried over sodium sulfate and subsequently evaporated under reduced pressure. The residual 1,4-dioxido-3-methyl-quinoxaline-2-carboxylic acid 2-ethoxyethyl ester is purified by adsorption on Kieselgel (eluting agent: ethyl acetate/petroleum ether). The compound melts at 66–68° C.

EXAMPLE 2

13.6 g. of benzofurazan oxide and 16.2 g. of acetoacetic acid 2-(methoxyethyl)ester are introduced into 200 ml. of methanol and dissolved with stirring. 10 ml. of butylamine are then added dropwise within 20 minutes causing the internal temperature to rise to 30° C. After the dropwise addition, the reaction mixture is held at 40° C. for 3 hours and then at room temperature for 12 hours. The solvent is then distilled off under reduced pressure. Residual butylamine is removed under vacuum. The 1,4-dioxido-3-methyl-quinoxaline-2-carboxylic acid 2-methoxyethyl ester which remains in the reaction mixture as a dark oil crystallizes after standing for 12 hours in the cold. The crystals are then slurried with ether, filtered and washed with ether. The product obtained, 2-methoxyethyl ester, melts at 115° C. after crystallization from high-boiling petroleum ether/benzene. 1,4-dioxido - 3 - methyl-quinoxaline - 2 - carboxylic acid

EXAMPLE 3

190 g. of benzofurazan oxide and 243.7 g. of acetoacetic acid 2-(ethoxyethyl) ester are dissolved with stirring in 420 ml. of methanol. 140 ml. of butylamine is then added dropwise within 30 minutes causing the temperature to rise to 35° C. This temperature is maintained for 3 hours by the exothermic reaction. When it begins to fall it is maintained with the aid of a warm water bath for 3 more hours. The reaction mixture is thereafter evaporated under reduced pressure. Residual butylamine is removed in a vacuum. The oily residue is taken up in 1.5 liters of ether. The precipitate which forms after about 30 minutes at room temperature is separated off and discarded. The filtrate is placed in a cold bath (acetone/Dry Ice). The product, 1,4-dioxido-3-methyl-quinoxaline-2-carboxylic acid 2-ethoxyethyl ester, which precipitates in yellow, fine crystals is filtered off by suction and washed with high-boiling petroleum ether. After recrystallization from ethyl acetate/petroleum ether (high-boiling), the ester melts at 67–68° C.

EXAMPLE 4

13.6 g. of benzofurazan oxide and 18.8 g. of acetoacetic acid 2-(ethoxypropyl) ester are dissolved in 200 ml. of methanol. 10 ml. of butylamine are added dropwise with stirring. After the dropwise addition of the base, the reaction mixture is stirred at 60° C. for 16 hours and subsequently at room temperature for 12 hours. The solvent is distilled off under reduced pressure with the excess base. The residual oil is purified by adsorption on silica gel (eluting agent: benzene/methanol 98:2). The product, crystalline 1,4-dioxido-3-methyl-quinoxaline-2-carboxylic acid 3-ethoxypropyl ester obtained melts at 55° C. after recrystallization from ether/high-boiling petroleum ether.

EXAMPLE 5

13.6 g. of benzofurazan oxide and 18.8 g. of acetoacetic acid 2-(isopropoxyethyl) ester are dissolved in 100 ml. of chloroform. 25 g. of anhydrous sodium sulphate are added to the solution and, with continuous stirring, 10 ml. of butylamine are added dropwise within 20 minutes causing the temperature to rise to 30° C. After the dropwise addition of the base, the reaction temperature is held at 40° C. for 4 hours. The reaction mixture is then filtered and the resulting filtrate is concentrated almost to dryness under reduced pressure. The residue is taken up in 100 ml. of methanol, heated to boiling under reflux conditions for 8 hours and subsequently concentrated, initially under reduced pressure, finally in high vacuum. The oily residue which results is partitioned between heptane and methanol. The methanolic phase is separated off and evaporated under reduced pressure. The residual partially crystalline product, 1,4-dioxido-3-methyl - quinoxaline-2-carboxylic acid 2-isopropoxyethyl ester melts at 89–91° C. after recrystallization from ether/heptane.

EXAMPLE 6

13.6 g. of benzofurazan oxide and 20.2 g. of acetoacetic acid 2-(butoxyethyl) ester are dissolved with stirring in 200 ml. of methanol. 10 ml. of butylamine are subsequently added to the solution dropwise within 30 minutes. After the dropwise addition of the base, the reaction mixture is heated to boiling under reflux conditions for 12 hours and subsequently concentrated, initially under reduced pressure, thereafter to dryness in vacuum. The resulting dark-red oil is treated with 250 ml. of ether. The resulting red precipitate which separates out after 1 hour is filtered off and discarded. The filtrate is boiled with active charcoal, filtered and subsequently shaken out with 2–N hydrochloric acid with the addition of ice. The ether phase is separated off, dried over anhydrous sodium sulphate and evaporated under reduced pressure. The resulting product, 1,4-dioxido-3-methyl-quinoxaline-2-carboxylic acid 2-butoxyethyl ester, which crystallizes from heptane/ether melts at 49–51° C. after recrystallization from heptane/ether.

EXAMPLE 7

13.6 g. of benzofurazan oxide and 21.5 g. of acetoacetic acid 2-(morpholinoethyl) ester are dissolved at room temperature in 200 ml. of methanol. 10 ml. of butylamine are then added to the solution dropwise. Since the reaction proceeds very slowly, the reaction mixture is stirred at 50° C. for 24 hours. The solvent and excess base are then distilled off under reduced pressure. The residual oily product, 1,4-dioxido-3-methyl-quinoxaline-2-carboxylic acid 2-morpholinoethyl ester, crystallizes after standing in the cold for 12 hours. The resulting crystals are slurried with ethyl acetate, filtered off and washed with ethyl acetate and ether. The resulting product, 1,4 - dioxido-3-methyl-quinoxaline-2-carboxylic acid 2-morpholinoethyl ester, melts at 118–120° C. after recrystallization from ethyl acetate.

EXAMPLE 8

16.6 g. of 5-methoxy-benzofurazan oxide and 17.4 g. of acetoacetic acid ethoxyethyl ester are dissolved in 100 ml. of chloroform and treated with 100 g. of anhydrous sodium sulphate. 10 ml. of n-butylamine are added dropwise to the mixture obtained at a rate which maintains the reaction temperature at below 35° C. After the temperature has subsided, the reaction mixture is heated to 40° C. for 4 hours with constant stirring and further stirred at room temperature for 12 hours. The sodium sulphate is filtered off and the filtrate is then evaporated to dryness under reduced pressure. The resulting residue is dissolved in 100 ml. of methanol. The resulting solution is then heated under reflux conditions for 8 hours. The methanol is then completely removed under reduced pressure and the resulting oily residue is dissolved in ether. The solution which results is shaken with active charcoal and filtered. The resulting filtrate is then concentrated. The resulting product, 6(or 7)-methoxy-1,4-dioxido-3-methyl-quinoxaline-2-carboxylic acid 2 - ethoxyethyl ester, which precipitates as crystals melts at 113–115° C. after recrystallization from ethyl acetate.

EXAMPLE 9

2.9 g. of 1,4-dioxido-3-methyl-quinoxaline-2-carboxylic acid ethyl ester are introduced into 20 ml. of dimethylformamide. The mixture is heated to 70° C. with stirring and 1.6 g. of bromine are added dropwise at 70–75° C. with stirring. The reaction mixture is then further stirred at 70–75° C. for 1 hour and thereafter concentrated under vacuum. The resulting residual brown oil is dissolved in ether/chloroform and repeatedly shaken out with water. The organic phase is separated off, decolorized with active charcoal, dried over sodium sulphate and concentrated. The resulting product, 1,4-dioxido-3-bromomethyl-quinoxaline-2-carboxylic acid 2-ethoxyethyl ester separates out as crystals on standing in the cold. It melts at 74–77° C. after recrystallization from ethyl acetate/n-heptane.

EXAMPLE 10

3.3 g. of 1,4-dioxido-3-bromomethyl-quinoxaline-2-carboxylic acid 2-ethoxyethyl ester are dissolved warm in 9 ml. of ethanol. A warm solution of 1.44 g. of sodium acetate and 2.5 ml. of water is then added to the solution. The resulting yellow reaction solution is then heated to boiling under reflux conditions for 30 minutes. The solvent is then removed under vacuum. The resulting residue is dissolved in 150 ml. of methylene chloride and the resulting solution is treated with active charcoal and anhydrous sodium sulphate, briefly heated to boiling, filtered and finally evaporated under reduced pressure. The residual viscous, oily product, 1,4 - dioxido-3-acetoxymethyl-quinoxaline-2-carboxylic acid 2-ethoxyethyl ester, crystallizes in the cold and melts at 120–122° C. after recrystallization from ethanol.

EXAMPLE 11

11 g. of 1,4-dioxido-3-methyl-quinoxaline-2-carboxylic acid and 5.75 g. of hydrosuccinimide were dissolved 150 ml. of dimethylsulfoxide under an atmosphere of nitrogen at room temperature. The resulting solution was treated with a solution of 11.5 g. of dicyclohexylcarbodiimide in 100 ml. of dimethylsulfoxide with stirring. The reaction mixture was heated to 35° C. The slightly exothermic reaction was held at this reaction temperature for about 1 hour. The reaction mixture after 12 hours was poured into about equal quantities of crushed ice and 1000 ml. of chloroform was added. The dimethylsulfoxide was removed by a triple extraction with 2000 ml. of water. The reaction solution was then dried over sodium sulfate, filtered and evaporated under reduced pressure. The resulting crystals of N-(3'-methyl-1',4'-dioxido-2'-quinoxalinyl-carbonyl-oxysuccinimide, after washing with ether and recrystallization from acetone/low boiling petroleum ether melts at 175–176° C.

0.2 g. of N-(3'-methyl-1',4'-dioxido-2'-quinoxalinyl-carbonyl)-oxysuccinimide were suspended in 4 ml. of Carbitol, containing 2 to 5 mg. of sodium as a catalyst. The suspension was heated under anhydrous conditions at about 100° C. causing all the material to go into solution. The reaction mixture was cooled to room temperature and then evaporated in a high vacuum. The resulting oily residue was purified by absorption on silica gel with ethyl acetate as the elution medium. The resulting product, 1,4 - dioxido-3-methyl-quinoxaline-2-carboxylic acid 2 - (2 - ethoxyethoxy)-ethyl ester, after recrystallization from ethyl acetate/ether melts at 49–51° C.

EXAMPLE 12

4.25 g. of 5-chlorobenzofurazanoxide and 4.4 g. of acetoacetic acid ethoxyethyl ester dissolved in 30 ml. of methanol were treated with 1.25 g. of dimethylamine dropwise at room temperature, with constant stirring. This caused an exothermic reaction in which the reaction temperature rose to about 50° C. The reaction mixture remained at that temperature for about 2 hours when it declined to about room temperature. The solvent was distilled off under reduced pressure. The resulting residue was taken up in about 250 ml. of chloroform. The chloroform extract, after the addition of ice was shaken out with dilute hydrochloric acid, distilled water, a saturated sodium carbonate solution and distilled water, dried over sodium sulfate and concentrated under reduced pressure. The residual oil was taken up in a little ether and treated with a drop of ethanol. The insoluble portion was filtered off. The product, 6(or 7) - chloro-1,4-dioxido-3-methyl-quinoxaline - 2-carboxylic acid 2-ethoxyethyl ester, was crystallized from the filtrate in the cold. The product, after recrystallization from normal heptane with the addition of a small amount of ethyl acetate, melts at 119–120° C.

EXAMPLE 13

47.5 g. of acetoacetic acid ethyl thioethyl ester were dissolved in 250 ml. of chloroform and 200 g. of anhydrous magnesium sulphate were added. 25 ml. of n-butylamine were dropped in with agitation. The mixture was thereupon heated with stirring for 3 hours under reflux conditions. After 12 hours, the reaction mixture cooled to room temperature and was filtered. The magnesium sulphate was discarded. The filtrate was evaporated under reduced pressure. The resulting product, 3-butylaminocrotonic acid-[2-(ethylthio)-ethyl]-ester was dissolved in a solution of 34 g. of benzofurazanoxide and 250 ml. of dimethylformamide and stirred 40 days at room temperature. Thereafter, the solvent was removed completely in a high vacuum. The brownish red oil which resulted was dissolved in methanol and decolorized active charcoal. The filtrate was evaporated under reduced pressure. The resulting oily residue was dissolved in ether and crystallized in the cold from a Dry Ice/acetone bath. The resulting product, 1,4 - dioxido-3-methyl-quinoxaline-2-carboxylic acid 2-ethylthioethyl ester after being washed with ether and recrystallized from ethyl acetate/ether melts at 80–81° C.

EXAMPLE 14

54.5 g. of acetoacetic acid carbitol ester were dissolved in 250 ml. of chloroform and 200 g. of anhydrous sodium sulphate was added. 25 ml. of n-butylamine were dropped in with constant stirring. The mixture was heated with stirring for 2 hours under reflux conditions. After 12 hours, the reaction mixture cooled to room temperature and was filtered. The sodium sulphate was discarded. The filtrate was evaporated under reduced pressure. The resulting residue of 3-butylaminocrotonic acid-[2-(2-ethoxyethoxy)-ethyl]-ester was dissolved in a solution of 34 g. of benzofurzanoxide in 250 ml. of dimethylformamide and stirred 40 days at room temperature. Thereafter, the solvent was completely evaporated in a high vacuum. The resulting dark brown oil was mixed with ether and crystallized in the cold (CO$_2$/acetone bath) by scratching. The resulting crude product was washed with ether, dissolved in ethyl acetate and decolorized with activate charcoal. The resulting product, 1,4-dioxido-3-methyl-quinoxaline-2-carboxylic acid-2-(ethoxyethoxy)-ethyl ester, after several recrystallizations from ether melts at 49–51° C.

EXAMPLE 15

17.4 g. of acetoacetic acid ethoxyethyl ester were dissolved in 50 ml. of chloroform and treated with 100 g. of anhydrous sodium sulphate. 10 ml. of n-butylamine were dropped in with agitation. The mixture was heated, with stirring, for 3 hours under reflux conditions. After 12 hours, the reaction mixture cooled to room temperature and was filtered. The sodium sulphate was discarded. The filtrate was evaporated under reduced pressure. The residue of 3 - butylamino - crotonic acid-[2-(ethoxy)-ethyl]-ester was dissolved in a solution of 15 g. of 5-methylbenzofurazanoxide in 100 ml. of methanol, stirred for 12 hours at 40° C. and then evaporated under reduced pressure. The resulting residue, 1,4-dioxido-3,6(or 7)-dimethyl-quinoxaline-2-carboxylic acid-2-ethoxyethyl ester, after washing with ether and recrystallized from acetone, melts at 132–134° C.

EXAMPLE 16

3.3 g. of 1,4-dioxido-2-bromomethyl-quinoxaline-2-carboxylic acid 2-ethoxy-ethyl ester was dissolved in 9 ml. of ethanol in the heat and mixed with a warm solution of 2.1 g. of sodium chloroacetate in 2.5 ml. of water. The clear solution was heated at boiling for 3 hours under reflux conditions. The solvent was distilled off under reduced pressure. The resulting oil was taken up in about 250 ml. of methylene chloride and shaken out three times with water. The organic phase was dried over sodium sulphate and concentrated to about 100 ml. under reduced pressure. The concentrate was filtered. The filtrate was evaporated by drying. The oil on top, after a brief time, crystallized as 1,4-dioxido-3-chloroacetoxy-methyl-quinoxaline-2-carboxylic acid-2-ethoxyethyl ester which melted after washing with ether and recrystallization from ethanol, at 98–99° C.

EXAMPLE 17

13.2 g. of 1,4-dioxido-3-bromomethyl-quinoxaline-2-carboxylic acid-2-ethoxyethyl ester were dissolved in 36 ml. of warm ethanol and thereafter treated with a warm solution of 10.4 g. of sodium benzoate in 15 ml. of water. The reaction mixture was heated 1.5 hours under reflux conditions. The deep red solution was evaporated under reduced pressure. The residual oil was dissolved in about 250 ml. of ether and a small amount of ethyl acetate. The crude product which crystallized in the cold was dissolved in a 10-fold amount of ethanol, decolorized with activated charcoal and evaporated under reduced pressure to dryness. The resulting product, 1,4-dioxido-3-benzoyloxymethyl-quinoxaline-2-carboxylic acid-2-ethoxyethyl ester, after 2-fold recrystallization from ethyl acetate/high boiling petroleum ether, melts at 99–101° C.

EXAMPLE 18

9.8 g. of 1,4-dioxido-3-bromomethyl-quinoxaline-2-carboxylic acid-2-ethoxyethyl ester were dissolved in 27 ml. of warm ethanol and thereafter mixed with a warm solution of 12.5 g. of sodium 3,4,5-trimethoxybenzoate in 7.5 ml. of water. The red reaction solution was heated at boiling 1 hour under reflux conditions, thereafter evaporated first under reduced pressure and then dried in a high vacuum. The residue was suspended in about 750 ml. of chloroform. The insoluble portion was filtered off. The filtrate was concentrated to a volume of about 150 ml. and thereafter about 750 ml. of ether was added with stirring. The resulting precipitate of pulverulent crude product was dissolved in hot alcohol and decolorized with activated charcoal. The resulting product, 1,4-dioxido-3-(3,4,5-trimethoxy)-benzoyloxy-methyl - quinoxaline - 2 - carboxylic acid-2-ethoxyethyl ester, after 2-fold recrystallization from ethanol, melts at 142–143° C.

In analogous manner one can also make 1,4-dioxido-3-salicyloxymethyl - quinoxaline - 2 - carboxylic acid-2-ethoxyethyl ester with a melting point of 112–113° C. by reacting sodium salicylate and 1,4-dioxido-3-bromomethyl-quinoxaline-2-carboxylic acid-2-ethoxyethyl ester.

EXAMPLE 19

18 g. of 1,4-dioxido-3-bromomethyl-quinoxaline-2-carboxylic acid-2-ethoxyethyl ester and 25 g. of 2-furan carboxylic acid were dissolved in 360 ml. of chloroform. After the addition of 13 g. of triethylamine, the solution was heated to boiling for 12 hours under reflux conditions and then dried after cooling under reduced pressure. The resulting residue of brownish red oil was dissolved in chloroform-ethyl acetate. The organic phase was washed several times with water, dried over sodium sulphate, and evaporated under reduced pressure. The oily residue was purified by adsorption on aluminum hydroxide. The elution medium was toluene/methanol, 99:1. The resulting product, 1,4-dioxido-3-(2-furoyloxy)-methyl-quinoxaline-2-carboxylic acid-2-ethoxyethyl ester, after washing with ether and recrystallizing from ethyl acetate melts at 101–103° C.

EXAMPLE 20

3.3 g. of 1,4-dioxido-3-bromomethyl-quinoxaline-2-carboxylic acid-2-ethoxyethyl ester were dissolved in 9 ml. of warm ethanol and mixed with a warm solution of 2.7 g. of 2-sodium thiophene carboxylic acid and 2.5 ml. of water. The reaction mixture was heated for 5 hours under reflux conditions and after cooling was evaporated under reduced pressure. The oily residue was taken up in chloroform. The chloroform phase was washed several times with water thereafter dried over sodium sulphate and evaporated under reduced pressure. The resulting oily residue was brought to crystallization with the addition of a small amount of ether in the cold. The crude crystalline product, 1,4 - dioxido - 3 - (2-thenoyloxy)-methyl-quinoxaline-2-carboxylic acid-2-ethoxyethyl ester, after washing with ether and recrystallizing from ethanol with the addition of activated charcoal, melts at 130–132° C.

In an analogous manner, one obtains 1,4-dioxido-3-(4-methyl-5-oxazolyl)-methyl-quinoxaline-2-carboxylic acid-2-ethoxyethyl ester with a melting point of 126–128° C. (ethyl acetate) from the reaction of 5-methyl-4-carboxyloxazol sodium salt and 1,4-dioxido-3-bromomethyl-quinoxaline-2-carboxylic acid-2-ethoxyethyl ester.

EXAMPLE 21

18 g. of 1,4-dioxido-3-bromomethyl-qiunoxaline-2-carboxylic acid-2-ethoxyethyl ester were suspended in 120 ml. of ethanol and after the addition of 5 g. of sodium thioacetate in 10 ml. of water was heated 30 minutes under reflux conditions. The reaction mixture was thereupon evaporated under reduced pressure. The resulting residue of brown oil was dissolved in about 750 ml. of chloroform and shaken out three times with 250 ml. of water each time. The organic phase was dried over sodium sulphate and evaporated under reduced pressure. The crude residue, i.e., the product 1,4-dioxido-3-acetylthiomethyl-quinoxaline-2-carboxylic acid - 2 - ethoxyethyl ester was dissolved in hot ethanol, decolorized with activated charcoal and recrystallized from ethanol/ethyl acetate. The pure compound melted at 121–124° C.

In an analogous manner, one obtains 1,4-dioxido-3-(1-oxidonicotinoyloxy)-methyl-quinoxaline-2-carboxylic acid ethoxyethyl ester melting at 190–192° C. (ethanol) by the reaction of sodium nicotinate-N-oxide and 1,4-dioxido-3-bromomethyl-quinoxaline-2-carboxylic acid - 2 - ethoxyethyl ester. Also, 1,4-dioxido-3-butyryloxy-methyl-quinoxaline-2-carboxylic acid-2-ethoxyethyl ester melting at 64–66° C. (ethanol) is produced by the reaction of sodium butyrate and 1,4-dioxido-3-bromomethylquinoxaline-2-carboxylic acid-2-ethoxyethyl ester.

EXAMPLE 22

1.8 g. of 1,4-dioxido-3-bromomethyl-quinoxaline-2-carboxylic acid-2-ethoxyethyl ester were suspended in 12 ml. of ethanol and heated 3½ hours under reflux conditions after the addition of 1.25 g. of sodium pivalinate in 8 ml. of water. Subsequently, the solvent was distilled off under reduced pressure. The residue was suspended in chloroform and shaken out several times with water. The chloroform phase was dried over sodium sulphate and evaporated under reduced pressure. The residue, 1,4-dioxido-3-pivaloyloxymethyl-quinoxaline - 2 - carboxylic acid-2-ethoxyethyl ester, after washing with ether and recrystallization from ethyl acetate/heptane, melts at 83–85° C.

EXAMPLE 23

11.1 g. of 1,4-dioxido-3-bromomethyl-quinoxaline-2-carboxylic acid-2-ethoxyethyl ester were suspended in 60 ml. of ethanol and mixed with a solution of 10.5 g. of sodium thiobenzoic acid in 30 ml. of water. The reaction at the start is slightly exothermic (about 30° C.). During reaction time, lasting 2 hours, constant stirring was maintained and the crude product precipitated as crystals at the completion of the reaction. The resulting product, 1,4-dioxido - 3 - benzoylthiomethyl-quinoxaline-2-carboxylic acid-2-ethoxyethyl ester melted after washing with ether and recrystallizing from ethanol at 108–110° C.

EXAMPLE 24

Capsules are formed by conventional means having the following composition:

|  | Mg. |
|---|---|
| 1,4 - dioxido - 3 - methyl-quinoxaline - 2 - carboxylic acid-2-ethoxyethyl ester | 25 |
| Lactose | 150 |
| Cornstarch | 30 |
| Talcum | 5 |
|  | 210 |

EXAMPLE 25

Tablets are formed by conventional means having the following composition:

|  | Mg. |
|---|---|
| 1,4 - dioxido - 3 - methyl-quinoxaline - 2 - carboxylic acid-2-ethoxyethyl ester | 10 |
| Silicic acid | 25 |
| Lactose | 115 |
| Cornstarch | 50 |
| Calcium stearate | 10 |
|  | 210 |

What is claimed is:
1. Compounds represented by the formula

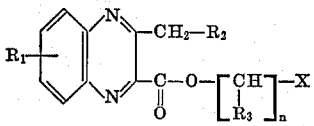

in which $R_1$ represents hydrogen, halogen, lower alkyl or lower alkoxy; $R_2$ represents hydrogen, halogen, lower alkanoyloxy, benzoyloxy, hydroxy benzoyloxy, mono or di-lower alkoxy benzoyloxy, 5 or 6 membered unsaturated heterocyclylcarbonyloxy, lower alkanoylthio, or benzoylthio; $R_3$ represents hydrogen; $n$ denotes a number from 2 to 3 inclusive; X represents lower alkoxy, lower alkylthio, lower dialkylamino, a monocyclic 5- or 6-membered saturated heterocyclic containing a nitrogen in the ring or a monocyclic 5- or 6-membered saturated heterocyclic containing a nitrogen and oxygen, sulfur or an additional nitrogen in the ring or N-monoxides thereof.

2. A compound according to claim 1 wherein $R_1$, $R_2$ and $R_3$ are each hydrogen, $n$ is 2 and X is ethoxy, i.e., 3-methyl-quinoxaline-2-carboxylic acid - 2 - ethoxyethyl ester.

3. Compounds represented by the formula

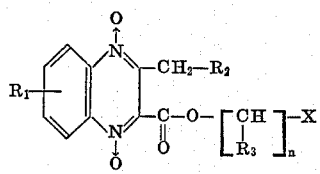

in which $R_1$ represents hydrogen, halogen, lower alkyl or lower alkoxy; $R_2$ represents hydrogen, halogen, lower alkanoyloxy, benzoyloxy, hydroxy benzoyloxy, mono or di-lower alkoxy benzoyloxy, 5 or 6 membered unsaturated heterocyclylcarbonyloxy, lower alkanoylthio, or benzoylthio; $R_3$ represents hydrogen; $n$ denotes a number from 2 to 3 inclusive; X represents lower alkoxy, lower alkylthio, lower dialkylamino, a monocyclic 5- or 6-membered saturated heterocyclic containing a nitrogen in the ring or a monocyclic 5- or 6-membered saturated heterocyclic containing a nitrogen and oxygen, sulfur or an additional nitrogen in the ring.

4. A compound according to claim 3 wherein $R_1$, $R_2$ and $R_3$ are hydrogen, $n$ is 2 and X is ethoxy, i.e., 1,4-dioxido-3-methyl-quinoxaline-2-carboxylic acid-2-ethoxyethyl ester.

References Cited
UNITED STATES PATENTS

| 3,600,388 | 8/1971 | Durckheimer et al. | 260—250 R |
| 3,660,398 | 5/1972 | Ley et al. | 260—250 R |
| 3,635,972 | 1/1972 | Cronin | 260—250 R |
| 3,639,400 | 2/1972 | Nast et al. | 260—250 R |

NICHOLAS S. RIZZO, Primary Examiner

U.S. Cl. X.R.

260—247.2 B, 243 B; 424—250